UNITED STATES PATENT OFFICE.

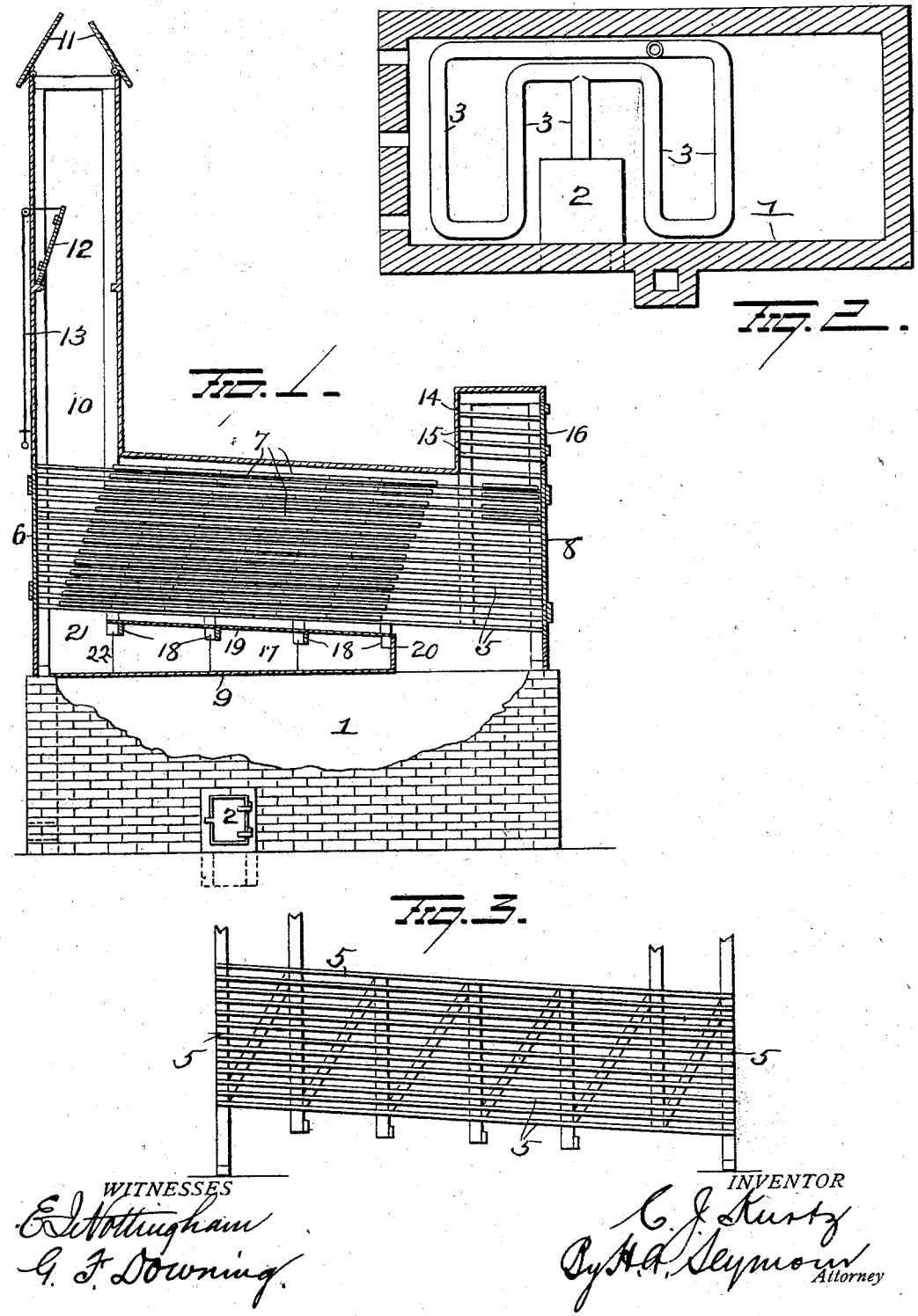

CLINTON J. KURTZ, OF SALEM, OREGON.

FRUIT-DRIER.

SPECIFICATION forming part of Letters Patent No. 705,767, dated July 29, 1902.

Application filed February 8, 1902. Serial No. 93,270. (No model.)

*To all whom it may concern:*

Be it known that I, CLINTON J. KURTZ, a resident of Salem, in the county of Marion and State of Oregon, have invented certain new and useful Improvements in Fruit-Driers; and I do hereby declare the following to be a full, clear, and exact description of the invention, such as will enable others skilled in the art to which it appertains to make and use the same.

My invention relates to an improvement in fruit-driers, the object of the invention being to provide an improved apparatus of this character in which trays of fruit can be inserted at one end and be gradually moved through the drying-chamber from the coolest to the hottest portion thereof (by the pressure of incoming trays making way for themselves) and be removed from the other end of the drying-chamber as fast as dried.

A further object is to provide an improved chamber for completing the thorough drying of fruit which may be too rapidly passed through the apparatus and also to provide improved means for distributing and maintaining a high temperature of air at the several parts of the drying-chamber.

With these objects in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a sectional view, and Fig. 3 is a detail view, of one side of the drying-chamber.

1 represents the air-heating chamber, composed, preferably, of masonry and in which a combustion-chamber 2 is located and has a circuit of pipes or flues 3 for the products of combustion to distribute the heat throughout the air-heating chamber. Above this air-heating chamber 1 and supported on the masonry walls thereof is my improved drying-chamber 4, composed of metal sheets and angle-iron or brace rods, as clearly shown in Fig. 3, and provided with a series of parallel rods or wires 5, inclined from one end to the other, and the top of the drying-chamber inclined parallel with the rods or wires 5, as shown. An inlet-door 6 for admission of the trays 7 is provided at one end of the drying-chamber, and an exit-door 8 is provided at the opposite end of the chamber, through which the trays are taken out.

At the top of air-heating chamber 1 and bottom of drying-chamber 4 a partition 9 is located and terminates some distance from the tray-outlet end of the drying-chamber to compel the heated air to pass, first, into contact with the trays at this end of the chamber, then circulate about the trays to the opposite end of the chamber, and escape through a flue 10, projecting up from the end of said chamber and provided at its top with hinged doors or dampers 11. An additional damper 12 is located in the flue 10 between the ends thereof and hinged, as shown, and is adapted to be operated by a cord or chain 13, passed through the wall of the flue, over a pulley, and terminates in convenient reach of the operator to permit him to raise and lower said damper to regulate the escape of the air from chamber 4 to accomplish the best results according to the fruit or other matter being treated.

On top of chamber 4 and communicating therewith at the top of the tray-outlet end thereof a dome or auxiliary drying-chamber 14 is located and provided with suitable tray-supports 15 and a door 16, permitting the entrance and exit of trays. This chamber 14 is provided for the purpose of finishing the drying operation of any fruit which may be too rapidly passed through chamber 4.

On partition 9 a dead-air chamber 17 is located and composed of a series of cross-bars 18 and top connecting-plate 19, parallel with the lowest rods or wires 5, and having an end plate 20, thus leaving an open space 21 at the inlet end of the drying-chamber below the trays to retard the flow of hot air, and in said dead-air chamber baffle-plates 22 are preferably located. It will thus be seen that by means of the dead-air chamber 17 and air-space 21 heat will be retained in the drying-chamber long enough to effectually dry all the fruit, and by this means the full benefit of the heat is obtained.

In operation trays 7, containing fruit, &c., to be dried, are inserted through door 6 onto wires or rods 5. Other trays being pushed onto said wires or rods force the old trays from the coolest point of the drying-chamber to the hottest, thus subjecting the fruit to a gradually-increasing temperature, and when the trays are passed throughout the entire length of the chamber they can be removed through the door 8.

It will thus be seen that with my improvements the drying operation is a continuous one, as new trays can be inserted as fast as old ones are removed, and should any of the fruit be not sufficiently dried the trays containing the same can be placed in auxiliary chamber 14 to complete the drying operation.

Of course my improved apparatus is adapted for other uses than drying fruit, and hence I do not wish to be limited to such operation, and a great many slight changes and alterations might be made in the general form and arrangement of the several parts described without departing from the spirit and scope of my invention, and hence I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a drying apparatus, the combination of a heating-chamber, a drying-chamber above the same and communicating at one end therewith, an outlet-flue at the opposite end of the drying-chamber, and a dead-air chamber between said heating and drying chambers.

2. In a drying apparatus, the combination of a heating-chamber, a drying-chamber communicating at one end therewith, a flue communicating with the outer end of the drying-chamber, and a dead-air chamber between said heating and drying chambers, said dead-air chamber communicating with the drying-chamber at the same end with which the outlet-flue communicates.

3. In a drying apparatus, the combination with a heating-chamber, a drying-chamber above the heating-chamber and communicating at one end therewith, and a flue communicating with the other end of the drying-chamber, of a hollow structure between said chambers and shorter than said chambers to permit communication between said chambers at one end of the apparatus and prevent such communication at the other end, said hollow structure forming a dead-air chamber in open communication with the outlet end of the drying-chamber and closed at its other end.

4. In a drying apparatus, the combination with a drying-chamber having doors at both ends and tray-supports extending throughout the length of said chamber to permit the continuous passage of trays therethrough, of an air-heating chamber below the drying-chamber, a partition between said chambers and terminating a distance from the tray-outlet end of the drying-chamber to permit the passage of heated air to this end of said drying-chamber, a flue at the tray-inlet end of said drying-chamber for the escape of air after passing through said chamber, dampers in said flue to regulate the draft of air and a dead-air space in said partition below the tray-supports, said dead-air chamber open at the end below the flue.

In testimony whereof I have signed this specification in the presence of two subscribing witnesses.

CLINTON J. KURTZ.

Witnesses:
O. W. KNOX,
W. W. JOHNSEN.